(12) United States Patent
Yoshida

(10) Patent No.: US 7,805,844 B2
(45) Date of Patent: Oct. 5, 2010

(54) ELECTRIC BUSH CUTTER

(75) Inventor: Kenichi Yoshida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 378 days.

(21) Appl. No.: 12/054,612

(22) Filed: Mar. 25, 2008

(65) Prior Publication Data
US 2008/0235957 A1 Oct. 2, 2008

(30) Foreign Application Priority Data
Mar. 29, 2007 (JP) ............................. 2007-086439

(51) Int. Cl.
B26B 19/00 (2006.01)
(52) U.S. Cl. .......................................... 30/276; 56/255
(58) Field of Classification Search .................. 30/276, 30/279.4; 56/12.7, 239, 255
See application file for complete search history.

(56) References Cited

U.S. PATENT DOCUMENTS 6,591,507 B2 * 7/2003 Kobayashi et al. ............ 30/276
2002/0124416 A1 * 9/2002 Warashina et al. ............ 30/276

FOREIGN PATENT DOCUMENTS

JP 05-122979 5/1993
JP 2006-217843 8/2006

* cited by examiner

Primary Examiner—Boyer D. Ashley
Assistant Examiner—Edward Landrum
(74) Attorney, Agent, or Firm—Smith, Gambrell & Russell, LLP

(57) ABSTRACT

An electric bush cutter includes an electric motor, which rotates a cutting edge through a centrifugal clutch, and an operating unit capable of adjusting rotational speed of the electric motor in accordance with an operation amount of the operating unit. A starting region including a rotational speed range from a stopped state of the electric motor to fastening of the centrifugal clutch, a common-use region corresponding to a rotational speed range suitable for bush-cutting by the electric bush cutter, and a transition region corresponding to a rotational speed range of the electric motor from the starting region to the common-use region are set. A rate of change in the rotational speed of the electric motor with respect to the operation of the operating unit in the transition region is greater than those in the starting region and common-use region.

4 Claims, 4 Drawing Sheets

ELECTRIC BUSH CUTTER

CROSS REFERENCES TO RELATED APPLICATIONS

The disclosure of Japanese Patent Application No. 2007-0864395 filed on Mar. 29, 2007, including the specifications, drawings, and abstracts are incorporated by reference herein.

BACKGROUND OF THE INVENTION

1. Field of the Invention

The present invention relates to an electric bush cutter, and more particularly, to an electric bush cutter which adjusts the rotational speed of a cutting edge on the basis of an amount of operation of operating means for adjusting the rotational speed of an electric motor, and which can adjust the rotational speed of the cutting edge in a common-use region with high precision.

2. Description of the Related Art

In recent years, an electric bush cutter that is driven by an electric motor is drawing attention due to vibration and noise problems of a related bush cutter that is driven by an engine (refer to, for example, Japanese Unexamined Patent Application Publication No. 2006-217843). The electric bush cutter not only can overcome the vibration and noise problems, but also can be made lighter and can be easily handled during a bush-cutting operation.

Related electric bush cutters have various structures so that they can adjust the rotational speed of a cutting edge in accordance with the environment of a bush-cutting operation. The simplest structure allows, for example, two-step adjustments in an eco mode and a high-speed mode. In the eco mode, the cutting edge is rotated at a low speed to perform a bush-cutting operation. In addition, in the eco mode, when an electric motor is driven using a battery, consumption current of the battery is made as low as possible, to increase the operating time of the battery. That is, the eco mode is used when an ordinary number of plants is to be subjected to a bush-cutting operation, so that the working time when the battery is charged once is at least a certain time.

The high-speed mode is used when a load is applied to the cutting edge such as, when a rather thick, small branch is subjected to a bush-cutting operation. Since the cutting edge is rotated at a high speed, the consumption current of the battery is increased. That is, the high-speed mode is used under a particular condition, such as when the bush-cutting operation cannot be performed at the normal rotational speed of the cutting edge. It is assumed that, in the high-speed mode, the working time is not long.

Although a related bush cutter having a structure that allows the rotational speed of a cutting edge to change in two or more steps may be provided, the basic technical concept of such a structure is similar to that described above. That is, switching the rotational speed of the cutting edge to a predetermined rotational speed in steps in accordance with the load applied to the cutting edge keeps consumption of the battery power low, so that the bush-cutting time is lengthened.

The aforementioned switching of the rotational speed of the electric motor in steps can be arbitrarily performed by, for example, using a change-over switch to change in steps, for example, a pulse or a voltage applied to the electric motor.

A structure that can continuously change the rotational speed of a cutting edge is achieved by continuously changing an amount of operation of operating means for adjusting the rotational speed of an electric motor. For the operating means for adjusting the rotational speed of the electric motor, for example, a throttle lever can be used. Due to the amount of operation, that is, the opening degree of the throttle lever, the rotational speed of the cutting edge can be set in accordance with a bush-cutting environment. According to this structure, the rotational speed of the cutting edge can be adjusted when necessary by operating the throttle lever. Therefore, the consumption current of the battery is restricted, thereby making it possible to increase the overall working time.

In this case, it is desirable that the rotational speed of the cutting edge, that is, the rotational speed of the electric motor with respect to the amount of operation of the throttle lever changes substantially linearly. For example, Japanese Unexamined Patent Application Publication No. 5-122979 discloses a rotational-speed controlling circuit that can approximate the relationship between an amount of manual operation and the rotational speed of the motor to a linear relationship, even if lagging of supply current resulting from self-inductance of a motor coil occurs.

In the related methods of switching in steps the rotational speed of the cutting edge, it is possible to quickly perform the bush-cutting operation after a switch of the electric motor is switched on. However, it is not possible to adjust the rotational speed of the cutting edge when the bush-cutting operation is being performed. Ordinarily, the rotational speed of the motor suitable for the bush-cutting operation has a certain range, so that, if the rotational speed of the cutting edge can be adjusted to within this range, the bush-cutting operation can be efficiently carried out. For example, the range (common-use region) of the rotational speed of the cutting edge suitable for an ordinary bush-cutting operation may be set from 6000 rpm to 8000 rpm. In this case, the bush-cutting operation is performed at substantially 6000 rpm when the number of plants to be subjected to the bush-cutting operation is small, and, as the number of plants to be subjected to the bush-cutting operation is increased, the rotational speed is increased, so that, even when the number of plants to be subjected to the bush-cutting operation is a maximum, the bush-cutting operation is performed at substantially 8000 rpm. This increases the working efficiency and the operating time of the battery. However, in the methods of switching the rotational speed of the cutting edge in steps, the rotational speed of the cutting edge cannot be adjusted in accordance with the aforementioned conditions, thereby reducing the working efficiency. In addition, when the electric motor is driven by a battery, the amount of time that the battery can be used when the battery is charged once is reduced because the rotational speed of the cutting edge is unnecessarily increased.

In the method in which the rotational speed of the electric motor is substantially linearly changed by the amount of operation of, for example, a throttle lever, the throttle lever must be operated until the rotational speed of the electric motor in the common-use region is reached after the switch of the electric motor is switched on. The smaller the amount of operation of the throttle lever, the more quickly a bush-cutting operation can be started. However, since the rate of change of the rotational speed of the electric motor with respect to this operation is proportionally changed without changing this rate over the entire rotational speed region, a predetermined time is required until the rotational speed of the electric motor reaches the common-use region. Therefore, when the bush cutter is intermittently used, each starting time makes the bush cutter less easier to handle.

Further, when the rotational speed of the electric motor reaches the lowest limit of the rotational speed in the common-use region, the rotational speed of the cutting edge can be proportionally adjusted between the lowest limit of the rotational speed and the highest limit of the rotational speed in the common-use region. Therefore, the rotational speed of the cutting edge can be adjusted in accordance with the number of plants to be subjected to the bush-cutting operation. However, since the rate of change of the rotational speed with respect to the operation is set so as to be a constant value, that is, so as not to change over the entire rotational speed region, the rate of change of the rotational speed of the cutting edge with respect to the amount of operation is large. Therefore, it cannot be said that the bush cutter is suitable for the common-use region. That is, since the rotational speed of the electric motor with respect to a slight operation of, for example, the throttle lever changes by a large amount, the rotational speed cannot be adjusted with precision, thereby causing working stress.

SUMMARY OF THE INVENTION

Accordingly, in view of the above-described problems, it is an object of the present invention to provide an electric bush cutter that allows the rotational speed of a cutting edge to reach a common-use region quickly after a switch of an electric motor is switched on, and that can adjust the rotational speed of the cutting edge with precision within the common-use region.

To this end, according to an aspect of the present invention, there is provided an electric bush cutter comprising an electric motor that rotates a cutting edge through a centrifugal clutch, and operating means for adjusting rotational speed of the electric motor. A range of operation of the operating means is divided into a plurality of regions including at least a starting region, a common-use region, and a first transition region. The starting region includes a range of the rotational speed of the electric motor from a stopped state of the electric motor to fastening of the centrifugal clutch. The common-use region corresponds to a range of the rotational speed of the electric motor suitable for a bush-cutting operation by the electric bush cutter. The first transition region corresponds to a range of the rotational speed of the electric motor from the starting region to the common-use region. A rate of change of the rotational speed of the electric motor with respect to the operation of the operating means in the first transition region is greater than that in the starting region and that in the common-use region.

By virtue of this structure, after the electric motor is switched on and the centrifugal clutch is fastened, a slight operation amount makes it possible for the rotational speed of the electric motor to quickly reach the common-use region, and the rotational speed of the electric motor to be adjusted with high precision in the common-use region in accordance with the number of plants to be subjected to a bush-cutting operation. The common-use region refers to the rotational speed region of the electric motor that is suitable for performing an ordinary bush-cutting operation on an ordinary number of plants. Therefore, it is possible to perform a bush-cutting operation on plants within a short starting time after the electric motor is switched on. In particular, it is possible to reduce the amount of wasted time when the number of passages of the starting region is increased, such as when the bush-cutting operation is intermittently performed. Further, since the rotational speed of the electric motor can be adjusted with high precision in accordance with the number of plants to be subjected to the bush-cutting operation, the bush cutter is easily handled. When the electric motor is driven using a battery, the consumption current of the battery can be efficiently restricted, so that the working time when the battery is charged once can be increased.

The range of the operation of the operating means corresponding to the common-use region may be wider than the range of the operation of the operating means corresponding to the starting region.

By virtue of this structure, the operation range of the operating means in the common-use region is wide. Therefore, when the rotational speed of the electric motor is finely adjusted in the common-use region, a throttle lever is easily handled, so that working efficiency is improved.

The plurality of regions may further include a high-rotation region and a second transition region. Here, the high-rotation region may correspond to a range of the rotational speed of the electric motor that is greater than the common-use region. The second transition region may correspond to a range of the rotational speed of the electric motor from the common-use region to the high-rotation region. The rotational speed of the electric motor in the high-rotation region may be constant regardless of an amount of the operation of the operating means.

In the high-rotation region of the operating means corresponding to a high rotational speed that is greater than the rotational speed of the electric motor in the common-use region, the operation amount of the operating means is set constant regardless of the operation amount as mentioned above. Therefore, in the high-rotation region, it unnecessary to worry about the operation of the operating means for adjusting the rotational speed. Consequently, the bush-cutting operation can be safely performed. For example, when a throttle-lever type operating means is used, it is possible to grip tightly the throttle lever to perform the bush-cutting operation.

The operating means for adjusting the rotational speed may comprise a throttle lever, and the amount of the operation may correspond to a throttle opening degree of the throttle lever. Therefore, the operation amount is very easily set and adjusted, so that the means for adjusting the rotational speed of the electric motor can be realized by a simple structure. Consequently, an operator can easily control the rotational speed of the electric motor while gripping a handle of the electric bush cutter, so that the bush-cutting operation can be safely performed.

According to the electric bush cutter of the present invention, the following advantages can be expected:

(1) The rotational speed of the electric motor can be quickly increased to the common-use region.

(2) Since, in the common-use region, the rate of change of the rotational speed of the electric motor with respect to the operation of the throttle lever is small, the rotational speed of the electric motor can be adjusted with higher precision.

(3) Due to the aforementioned (1) and (2), when the electric motor is driven using a battery, the consumption current of the battery is efficiently restricted, so that it is possible to increase the amount of time that the battery that is charged once can be used.

DESCRIPTION OF THE PREFERRED EMBODIMENTS

Figure 1:
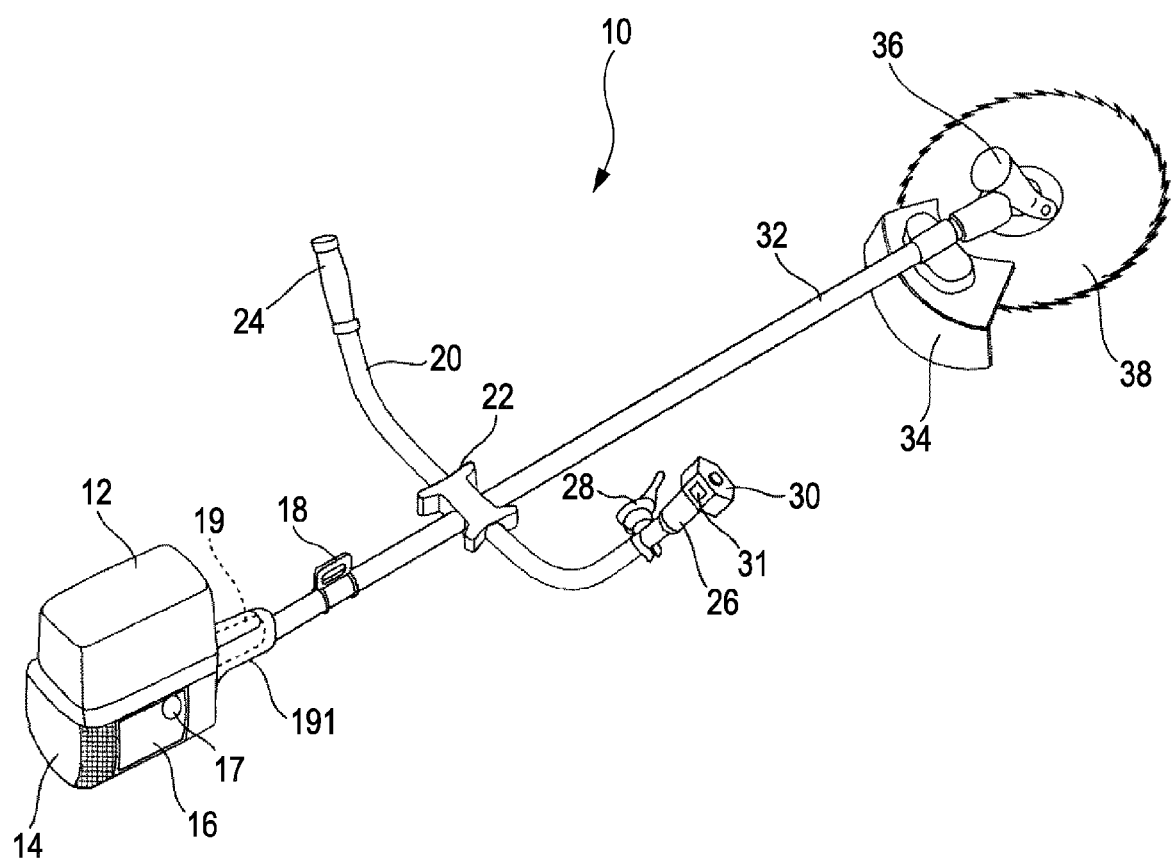
FIG. 1 is a perspective view of an entire electric bush cutter according to the present invention.

An embodiment of the present invention will hereunder be described with reference to the drawings. As shown in FIG. 1, an electric bush cutter 10 is carried on the shoulder of an operator using a shoulder band (not shown) mounted to a hangar 18 on a main pipe 32. Then, the operator grips with both hands a handle 20 mounted to the main pipe 32 by a handle fastener 22, to perform a bush-cutting operation. For the operator to grip with both hands the handle 20 and to perform the bush-cutting operation, the handle 20 is provided with a left grip 24 and a right grip 26.

A cutting edge 38 is mounted to an end of the main pipe 32, disposed in front of the handle 20, through a gear (not shown), such as a pinion gear accommodated in a gear case 36. An anti-scattering cover 34 for preventing, for example, bush-cut plants from being scattered to the operator, is mounted to the vicinity of the gear case 36 at the main pipe 32.

A motor case 14 is mounted to a portion of the main pipe 32, disposed behind the handle 20, through a clutch case 191. A battery 12 is mounted to the top face of the motor case 14, and a motor unit panel 16 is provided at a side face of the motor case 14. An electric motor M is accommodated in the motor case 14, and is controlled by the motor unit panel 16. Electric Power to the motor unit panel 16 and the electric motor M in the motor case 14 is supplied by the battery 12. The motor unit panel 16 is used for controlling the electric motor M, and is provided with a main switch 17 for stopping the electric motor M.

In the electric bush cutter 10, the cutting edge 38 is rotationally driven by transmitting the rotation of the electric motor M in the motor case 14 through a centrifugal clutch 19 in the clutch case 191, a transmission shaft (not shown) in the main pipe 32, and the gear in the gear case 36.

The centrifugal clutch 19 accommodated in the clutch case 191 is used for connecting and disconnecting a path that transmits the rotation of the electric motor M to the cutting edge 38. That is, when the electric motor M is stopped, the centrifugal clutch 19 is in a disconnected state. When the main switch 17 is switched on, and the rotational speed of the electric motor M is increased to a predetermined rotational speed, the centrifugal clutch 19 is connected, so that the rotation of the electric motor M is transmitted to the cutting edge 38. In contrast, when the rotational speed of the electric motor M is reduced to a rotational speed that is less than or equal to the predetermined rotational speed, the centrifugal clutch 19 is disconnected, so that the cutting edge 38 rotates independently of the electric motor M. Therefore, when the rotation of the cutting edge 38 is stopped as a result of the cutting edge 38 being caught in, for example, a plant during the bush-cutting operation, the centrifugal clutch 19 is disconnected, so that excessive load is prevented from being applied to the electric motor M.

Figure 2:
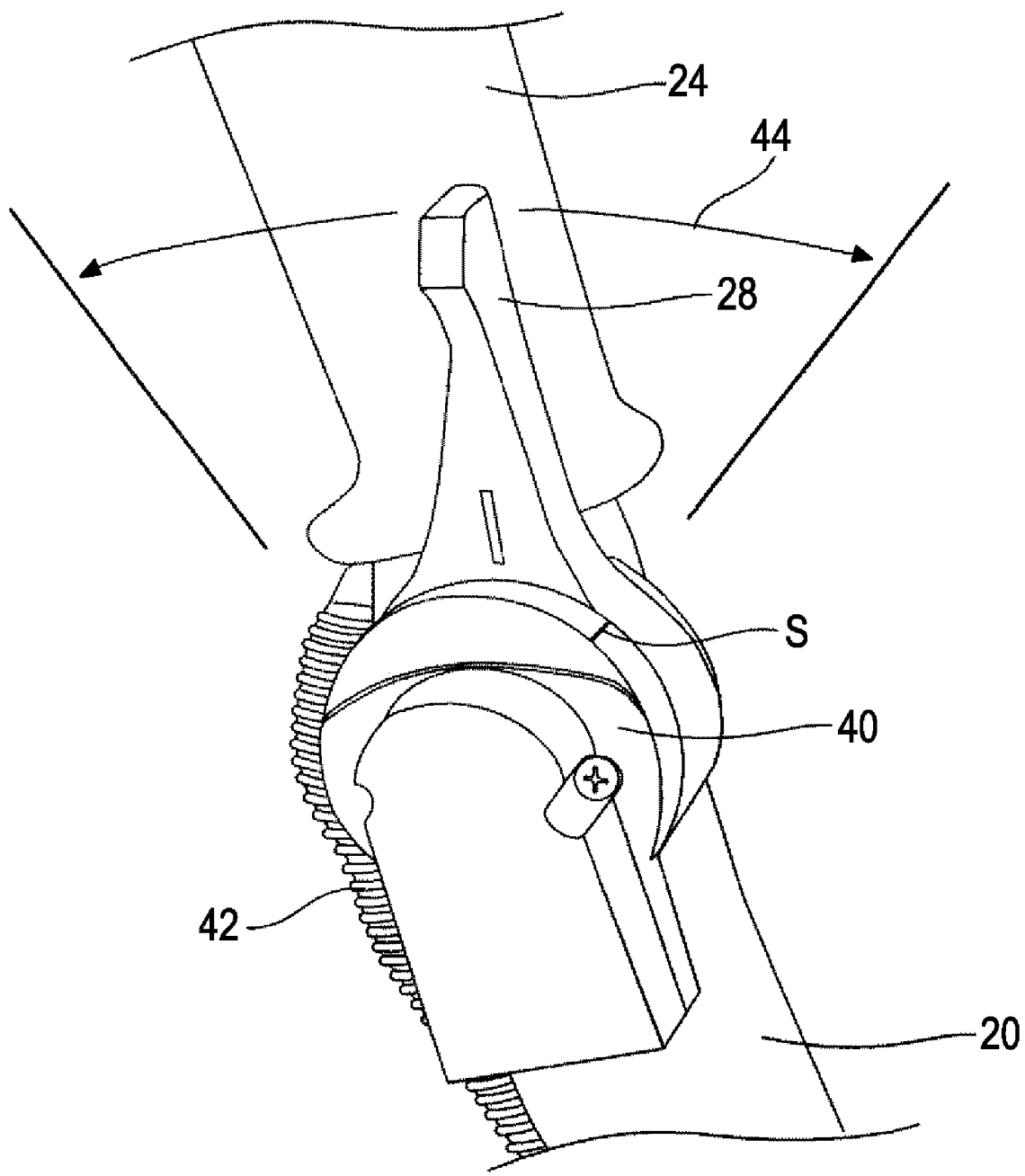
FIG. 2 is an enlarged perspective view of the main portion of the electric bush cutter shown in FIG. 1.
Figure 3:
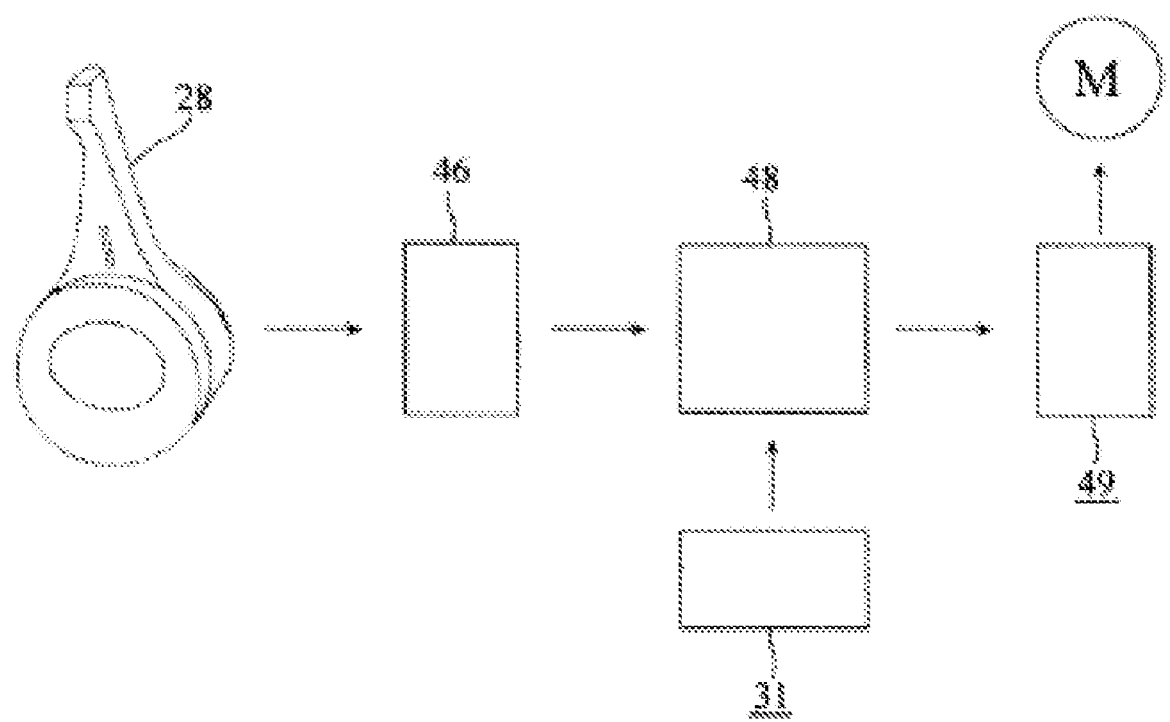
FIG. 3 is a block diagram for controlling an electric motor of the electric bush cutter shown in FIG. 1.

As shown in FIG. 2, a throttle lever 28, serving as operating means for adjusting the rotational speed of the electric motor M, is accommodated in a throttle lever body 40, secured to the handle 20, and can rotate through a particular angle range from a standard point S. The particular angle range is denoted as a rotation region 44. In the embodiment, the standard point S is positioned adjacent to the body of the operator who is performing bush-cutting by holding the handle 20, so that the lever 28 can be rotated by substantially 90 degrees towards the cutting edge 38 by an operation with a finger.

The throttle lever 28 is formed so that, even if the operator grips the right grip 24 with his/her right hand, the operator can operate the throttle lever 28 with, for example, his/her thumb, and so that, when the throttle lever 28 is moved so as to be pushed out away from the standard point S (towards the left in FIG. 2), the rotational speed of the electric motor M is increased. In addition, the throttle lever 28 is formed so that, when the throttle lever 28 is moved towards the standard point S (towards the right in FIG. 2), the rotational speed of the electric motor M is reduced, thereby stopping the rotation of the electric motor M at the standard point S.

A control line 42 is connected to the throttle lever body 40 to which the throttle lever 28 is mounted, is disposed along the handle 20 and the main pipe 32, and is connected to the motor unit panel 16. Above the throttle lever 28, a switch box 30 is provided at an end of the right grip 26. A stop switch 31 is mounted in the switch box 30. A signal of the stop switch 31 is input to a control circuit 48 (described later). When the stop switch 31 is switched on (not shown), the control circuit 48 stops supply of electrical current to the electric motor M from the battery 12, to stop the electric motor M. In contrast, when the stop switch 31 is switched off (not shown), the control circuit 48 causes the electrical current to be supplied to the electric motor M from the battery 12, so that the electric motor M is in a rotatable state in accordance with the operation of the throttle lever 28.

A variable resistor (not shown) is built in the throttle lever body 40. Operating the throttle lever 28 causes the resistance value of the variable resistor to change. Then, the resistance value of the variable resistor is input as an analog signal to an operation-amount changing unit 46 through the control line 42.

The input resistance value of the variable resistor is converted into a digital signal by an AD converter of the operation-amount converting unit 46, and the converted digital signal is input to the control circuit 48 including, for example, a central processing unit (CPU) or a random access memory (RAM). In the control circuit 48, for example, a predetermined calculation is performed by a predetermined program, and the digital signal is output to a motor drive circuit 49 on the basis of the calculation result. When the motor drive circuit 49 receives an instruction from the control circuit 48, electrical current that is in accordance with the instruction is supplied to the electric motor M by the motor drive circuit 49, to increase or decrease the rotational speed of the electric motor M.

Figure 4:
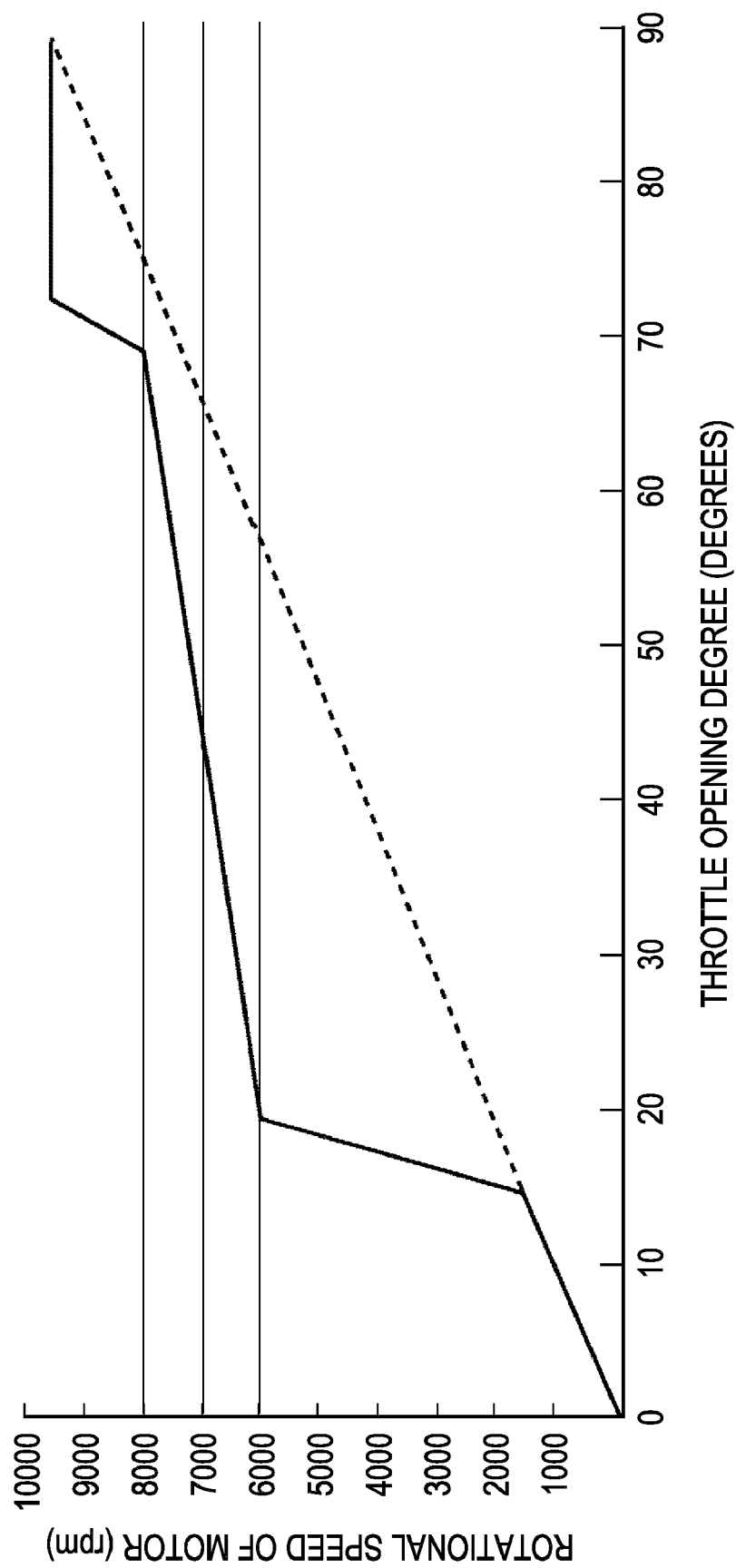
FIG. 4 is a characteristic diagram illustrating the relationship between a rotational speed of the electric motor and a throttle opening degree of the electric bush cutter according to the present invention.

In FIG. 4, the horizontal axis represents a throttle opening degree (in degrees) of the throttle lever 28, and the vertical axis represents the rotational speed (in rpm) of the electric motor M. The throttle opening degree indicates the amount of operation of the throttle lever 28 from the standard point S. In the embodiment, the operation amount is from 0 degrees to substantially 90 degrees, but may be greater than or equal to 90 degrees.

The rotational speed of the electric motor M changes in accordance with the throttle opening degree of the throttle lever 28. The throttle opening degree is divided into a plurality of regions, so that a different rate of change of the rotational speed of the electric motor M is set for each region. That is, the rate of change of the rotational speed of the electric motor M for each region of throttle opening degree is predetermined by, for example, a program. The controlling method can be changed as appropriate on the basis of design. For example, the rotational speed of the electric motor M with respect to the change in the throttle opening degree can be set so as to change in a curve.

Among the throttle opening degree regions, the region corresponding to a range of rotational speed (rpm) of from substantially 6000 to 8000 rotations/minute of the electric motor M refers to a common-use region. In the common-use region, bush-cutting of an appropriate number of plants can be comfortably performed. In addition, the region corresponding to a range of rotational speed of from 0 to substantially 1500 rotations/minute of the electric motor M refers to a starting region. The starting region corresponds to the range of from a stopped state of the electric motor M to fastening of the clutch 19. Further, the region corresponding to a range of rotational speed of from substantially 1500 to 6000 rotations/minute of the electric motor M refers to a first transition region. The first transition region extends from the starting region to the common-use region. The broken line shown in FIG. 4 shows the related controlling method in which the amount of operation of the throttle lever and the rotational speed of the electric motor M are simply proportionally changed.

The range of from 0 degrees to substantially 15 degrees of the throttle opening degree corresponds to the starting region. The change in the rotational speed of the electric motor M with respect to the throttle opening degree in the starting region is similar to that in a related controlling method. When the rotational speed of the electric motor M becomes substantially 1500 rotations/minute, the centrifugal clutch 19 is fastened, so that the electric motor M and the cutting edge 38 are interlocked. The rotational speed at which the centrifugal clutch 19 is connected can be determined as appropriate.

The range of from substantially 15 degrees to substantially 20 degrees of the throttle opening degree corresponds to the first transition region. The change in the rotational speed of the electric motor M with respect to a change in the throttle opening degree in the first transition region is more rapidly than that in the starting region. That is, the rate of change of the rotational speed of the electric motor M with respect to the change in the throttle opening degree is larger. Accordingly, simply rotating the throttle lever 28 by 5 degrees from substantially 15 degrees at which the centrifugal clutch 19 is connected, the rotational speed of the electric motor M reaches the rotational speed of 6000 rotations/minute, which is the lower limit in the common-use region. In contrast, in the related controlling method, unless the throttle lever 28 is operated to a throttle opening degree of up to substantially 58 degrees, the rotational speed of the electric motor M does not reach the lower limit of the common-use region.

Therefore, the electric bush cutter according to the present invention makes it possible to quickly increase the rotational speed of the electric motor M to the common-use region, so that the time required to start bush-cutting can be shortened. Therefore, the operability of the bush cutter is excellent. In addition, when the bush cutter is intermittently used, since each starting time required to reach the common-use region can be shortened, wasteful working time can be shorted, so that the bush cutter is easily handled.

The range of from substantially 20 degrees to substantially 70 degrees of the throttle opening degree corresponds to the common-use region. In the common-use region, the throttle opening degree and the rotational speed of the electric motor M are in a substantially proportionate relationship. The common-use region extends over a wide range of substantially 20 degrees to substantially 70 degrees, that is, over a wide range of substantially 50 degrees. That is, the rate of change of the rotational speed of the electric motor M with respect to the change in the throttle opening degree is smaller. Accordingly, the range of operation of the throttle lever 28 in the common-use region is more widened.

In the related controlling method, the throttle opening degree corresponding to the common-use region is limited to the range of from substantially 58 degrees to substantially 76 degrees, that is, to the range of substantially 18 degrees. Therefore, the range of operation of the throttle lever 28 in the common-use region is narrower.

Consequently, compared to the related controlling method, the embodiment makes it possible to precisely and finely adjust the rotational speed of the electric motor M in the common-use region, so that the rotational speed of the electric motor M can be finely adjusted in accordance with a working field, such as a slight change in the number of plants to be subjected to bush cutting. In addition, since the range of operation of the throttle lever 28 in the common-use region is wider, the operator can easily handle the bush cutter, thereby eliminating working stress.

The regions in which the throttle opening degree is greater than or equal to substantially 70 degrees include a high-rotation region and a second transition region. In the high-rotation region, the rotational speed of the electric motor M is made constant at substantially 9500 rotations/minute for using the bush cutter for the purpose of bush-cutting a relatively thick small branch. The second transition region corresponds to the range of rotational speed of the electric motor M from the common-use region to the high rotation region.

The range of from substantially 70 degrees to substantially 72 degrees of the throttle opening degree corresponds to the second transition region. The rate of change in the rotational speed of the electric motor M with respect to a change in the throttle opening degree in the second transition area is larger. Accordingly, only rotating the throttle lever 28 by 2 degrees from substantially 70 degrees of the throttle opening degree causes the rotational speed of the electric motor M to reach 9500 rotations/minute in the high-rotation region.

The range of throttle opening degree that is greater than or equal to 72 degrees corresponds to the high-rotation region. In the high-rotation region, the rotational speed of the electric motor M is made constant because it is not frequently necessary to finely adjust the rotational speed of the electric motor M for the aforementioned purpose, and because, if the rotational speed of the electric motor M is made adjustable, the operator will be distracted by the throttle lever 28 when perform bush-cutting, which is not desirable from the viewpoint of safety.

The relationship between the rotational speed of the electric motor M and the throttle opening degree is only one exemplary relationship, so that the bush cutter can be arbitrarily designed in accordance with, for example, the working environment.

Next, the working time in a field using a related electric bush cutter and the working time in a field using the electric bush cutter according to the present invention were measured. Batteries having the same capacity were used. For example, the performances of electric motors M and throttle levers 28 were based on the same standards. Only methods of controlling the rotational speeds of the electric motors M with respect to amounts of operations of the throttle levers 28 differed. That is, in the related electric bush cutter, the rotational speed of the electric motor M changed proportionally with respect to the operation amount over an entire rotation region 44 of the throttle lever 28. In contrast, in the electric bush cutter according to the present invention, the rate of change in the rotational speed of the electric motor differed in each of a plurality of regions as mentioned above. The measurement results at the field using the related electric bush cutter are as follows. The minimum, the maximum, and the average value of the working time allowed when the battery is charged once are 20 minutes, 66 minutes, and 36 minutes, respectively. The measurement results at the field using the electric bush cutter according to the present invention are as follows. The minimum, the maximum, and the average value of the working time allowed when the battery is charged once are 35 minutes, 55 minutes, and 43 minutes, respectively. The results show that the electric bush cutter according to the present invention has little variations in the working time, so that the time of use of the battery that is charged once can be increased. This is the result of efficiently restricting wasteful consumption current due to making it possible to reduce the starting time for the rotational speed of the electric motor M to reach the common-use region, and making it possible to efficiently change the rotational speed of the electric motor M in accordance with a state of the working field.

The present invention is not limited to the above-described embodiment, so that various modifications can be made without departing from the gist of the present invention. For example, although, in the embodiment, in the range of from 0 degrees to 90 degrees of the throttle opening degree, the range of the throttle opening degree in the common-use region is set from substantially 20 degrees to substantially 70 degrees, the present invention is not limited thereto. The throttle opening degree can be arbitrarily set in accordance with the working environment of the bush cutter. In addition, although the rotational speed of the electric motor M in the common-use region is from 6000 rpm to 8000 rpm, it may also be determined as appropriate in accordance with the working environment.

What is claimed is:

1. An electric bush cutter comprising:
   an electric motor that rotates a cutting edge through a centrifugal clutch; and
   operating means for adjusting rotational speed of the electric motor,
   wherein a range of operation of the operating means is divided into a plurality of regions including at least a starting region, a common-use region, and a first transition region,
   wherein the starting region includes a range of the rotational speed of the electric motor from a stopped state of the electric motor to fastening of the centrifugal clutch,
   wherein the common-use region corresponds to a range of the rotational speed of the electric motor suitable for a bush-cutting operation by the electric bush cutter,
   wherein the first transition region corresponds to a range of the rotational speed of the electric motor from the starting region to the common-use region, and
   wherein a rate of change of the rotational speed of the electric motor with respect to the operation of the operating means in the first transition region is greater than that in the starting region and that in the common-use region.

2. The electric bush cutter according to claim 1, wherein the range of the operation of the operating means corresponding to the common-use region is wider than the range of the operation of the operating means corresponding to the starting region.

3. The electric bush cutter according to claim 2, wherein the plurality of regions further include a high-rotation region and a second transition region,
   wherein the high-rotation region corresponds to a range of the rotational speed of the electric motor that is greater than the common-use region,
   wherein the second transition region corresponds to a range of the rotational speed of the electric motor from the common-use region to the high-rotation region, and
   wherein the rotational speed of the electric motor in the high-rotation region is constant regardless of an amount of the operation of the operating means.

4. The electric bush cutter according claim 1, wherein the operating means comprises a throttle lever, and an/the amount of the operation of the operating means corresponds to a throttle opening degree of the throttle lever.

* * * * *